United States Patent [19]

Repetto et al.

[11] Patent Number: 4,592,066

[45] Date of Patent: May 27, 1986

[54] CONDUCTIVE BOTTOM FOR DIRECT CURRENT ELECTRIC ARC FURNACES

[75] Inventors: Eugenio Repetto; Fabrizio Marafini, both of Rome; Francesco Tesini, Genoa, all of Italy

[73] Assignee: Italimpianti-Societa Italiana Impianti P.A., Genoa, Italy

[21] Appl. No.: 688,764

[22] Filed: Jan. 4, 1985

[30] Foreign Application Priority Data

Feb. 2, 1984 [IT] Italy .............................. 47641 A/84

[51] Int. Cl.$^4$ .............................................. H05B 7/00
[52] U.S. Cl. ..................................................... 373/72
[58] Field of Search .................... 373/71, 72, 108, 107; 266/265

[56] References Cited

U.S. PATENT DOCUMENTS

| 941,419 | 11/1909 | Keller | 373/72 |
| 3,905,589 | 9/1975 | Schempp et al. | 373/72 |
| 4,228,314 | 10/1980 | Stenkvist | 373/72 |
| 4,549,301 | 10/1985 | Motte et al. | 373/108 |

FOREIGN PATENT DOCUMENTS 0058817 9/1982 European Pat. Off. .
2042309 9/1980 United Kingdom .

Primary Examiner—Roy N. Envall, Jr.
Attorney, Agent, or Firm—Young & Thompson

[57] ABSTRACT

In a direct current electric arc furnace with at least one movable electrode and at least one part of the bottom of the furnace of electrically conductive material, used as a return electrode, that part of the furnace bottom is formed of an assembly of diverse coacting parts, namely:

a easily removable electrically conductive prefabricated element in contact with the metal bath, an intermediate part of electrically conductive granular material, and a terminal metal part, in contact with the intermediate part, electrically insulated from the shell of the furnace, comprising a metal collector plate whose upper surface is in contact with the intermediate part, and having a terminal metal rod on the lower face. That lower face and the metal rod are in contact with a non-conductive refractory material. The extremity of the metal rod protrudes outside the furnace, is cooled and is connected to the power supply. The furnace bottom can also include at least one porous body for blowing gas into the metal bath.

9 Claims, 3 Drawing Figures

CONDUCTIVE BOTTOM FOR DIRECT CURRENT ELECTRIC ARC FURNACES

The present invention relates to the conductive bottoms of electric arc furnaces. Here the term "conductive bottom" refers to the assembly of metal, refractory and/or conductive refractory parts, situated on the bottom of the furnaces, through which the electric circuit is closed.

At present, there are two basic types of conductive bottoms. In the first type, metal bars are buried in the refractory bottom, emerge inside the furnace and are connected together at their ends to form a single conductor. A variation of this first type of furnace involves metal bars in contact on the underside with a layer of graphite which rests on electrically-conductive brickwork. This brickwork rests on a cooled metal section that ensures the current return, of the furnace bottom, electrically insulated from the rest of the body. This variation is described in British Pat. No. 2,017,463 A.

The main drawback of this first type of conductive bottom is that the whole of the bottom is involved in electrical conduction and is thus affected by the consequent modifications, which makes the adaptation of existing furnaces and bottom repairs long, difficult operations. Moreover, the layer of electrically conductive bricks results in a large dispersion of energy owing to the Joule effect, while not offering good resistance to the possible infiltration of liquid metal, thus posing further safety problems.

The second type of conductive bottom, exemplified in British patent appln. No. 2,042,309 A, provides for a prefabricated conductive part, in contact with the metal bath on one side and on the other with a layer of graphite carried on electrically conductive brickwork. In this application, the prefabricated part consists of a metal plate which has on its face farthest from the bath a series of bars, buried in refractory material. Current return is via a large, cooled metal section on the furnace bottom.

The advantage of this latter embodiment is easy repair of the furnace, by replacing the prefabricated element. However, the mainly metal structure of the prefabricated part will predictably result in rapid wear. There remain, however, the drawbacks of the first type of conductive bottom.

Direct current electric arc furnaces also have other problems essentially bound up with their structure. For instance, an important problem is the distribution of the heat generated by the arc throughout the metal bath. Owing to the use of only one electrode there is marked overheating of the part of the bath beneath the electrode; furthermore, because direct current is employed, no strong currents are generated by electromagnetic effects to stir the liquid metal and ensure rapid diffusion of heat in the peripheral parts of the bath. It can thus be difficult to melt scrap rapidly, and the central part of the furnace bottom, made of current-conducting material which tends to be the most delicate, may be seriously overheated even to the point of breakthrough.

The purpose of the present invention is to eliminate most of the above-mentioned drawbacks inherent in the solutions known in the present state of the art, by providing a conductive bottom that is cheap and easy to repair, while ensuring very low heat dispersion and low risk of breakthrough.

According to the present invention, an improved bottom for direct current electric arc furnaces is advantageously formed of an assembly of coacting parts, namely:

at least one removable electrically conductive prefabricated element in contact with the metal bath and resting on an intermediate part of electrically conductive granular material resting on a terminal metal part, electrically insulated from the shell of the furnace, consisting of a conductive metal plate having on its face farthest from the bath a metal rod which runs through the refractory bottom of the furnace and protrudes partially therefrom; and means for cooling the end of the metal rod outside the furnace.

The removable prefabricated part can consist of a refractory casting with metal bars passing through it or alternatively of an electrically conducting refractory casting. Between this prefabricated element and the intermediate part a plate-like metal element can be inserted, preferably as an integral part of the prefabricated element, to provide stiffening.

Furthermore, according to this invention, it is possible to insert bodies in the furnace bottom through which known, controllable flows of gas can be introduced into the metal bath. Said gas—argon, for instance—bubbles through the bath, forming a rising current of bubbles whose function will be examined in greater detail hereafter. These bodies for the introduction of gas into the bath can advantageously consist of porous bricks well known in traditional oxygen steelmaking. Of the various types of porous bricks available, those with orientated porosity are preferable; in these, the refractory body of the brick is traversed from one end to the other by a series of narrow, more or less parallel empty channels. These bricks can be set in the center of the furnace bottom or concentrically around the axis of the furnace, forming either a complete continuous ring or a number of symmetrically-located zones for introduction of the gas.

The gas supply to the zones concerned can be ensured via a series of independent lines, one for each zone, perhaps connected to a manifold outside the furnace, inserted in the wall; alternatively the various porous bodies can be connected directy to a single distributor, fed by a line coming from outside the furnace. In any case, it is not believed that the details of the way the gas is carried from outside the furnace to the porous bodies are of decisive importance for the purpose of this invention; hence the gas supply can be constructed in the manner and with the means most suitable for each individual situation.

Numerous advantages are assured by this latter improvement as per the present invention:

The gas bubbling into the furnace at a rate that is easily controlled for each porous body—e.g. between 5 and 50 Nl/s—favors the establishment of convection currents in the liquid steel. As these currents start from the overheated part of the furnace, or near to it, they ensure efficient removal of heat from that zone, with better, more rapid heating of the peripheral zones and hence shorter melting times. Another benefit intimately related to the bubbling of gas is that the furnace-bottom zone beneath the electrode, affected by the passage of the current and intrinsically more important and more delicate, is subject to less thermal stress because, as indicated above, the overheated part of the bath is largely eliminated by the convection currents generated by the passage of the gas.

Further cooling of the conducting part of the furnace bottom is provided by the gas that flows in the pipes or in the supply manifolds to the porous bricks; these pipes or manifolds can be advantageously designed to optimize this cooling effect, thus lengthening the useful life of the furnace bottom.

Yet another advantage is the fact that after the flow of gas has passed through the bath, it can be used, if need be, for the formation of foamed slag, the composition of which can be controlled by means of compounds introduced through a special conduit in the electrode, adopting a technique well known in the art.

In this way it is now possible to treat a whole series of steels—e.g. stainless steels—by foamed slags (usually obtained in the oxidizing phase by the addition of carbon) which it has hitherto been impossible to treat in this manner. In this case it is preferable to utilize an annular arrangement of porous bricks set concentrically around the axis of the furnace and of the extension of the electrode centerline. This arrangement ensures that the rising current of gas bubbling to the surface of the metal bath favors foaming under the tip of the electrode, so as to derive the greatest benefits from the formation of the foamed slag, essentially by screening the walls of the furnace from arc radiation. Finally, it seems likely that the inert gas bubbling in the zone of the electric arc and saturating the surrounding atmosphere reduces the absorption of ambient gas, particularly nitrogen, by the bath.

This invention will now be described in relation to embodiments indicated purely by way of exemplification without in any way limiting the objects and precepts of the invention. These embodiments are illustrated in the accompanying drawings, wherein.

Figure 1:
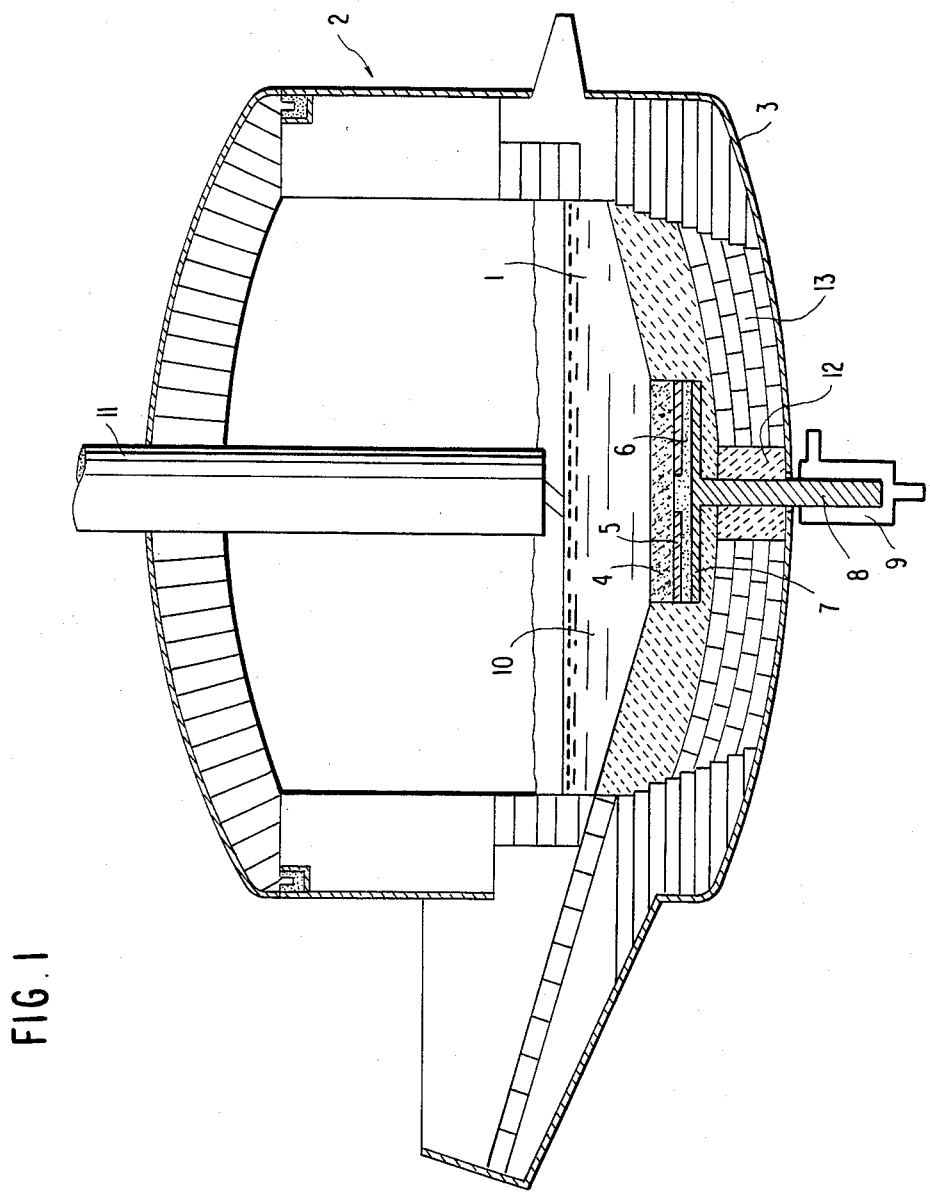
FIG. 1 shows a vertical section through a direct current electric arc furnace fitted with a conductive bottom as per this invention.

With reference to FIG. 1 at the center of the hearth 1 of a furnace 2, in a specially provided recess, there is a metal plate 7 with a rod 8 on its lower face, extending downward through the bottom refractory of the furnace and protruding outside the furnace itself. This rod 8 is electrically insulated from the metal shell 3 of the furnace. The external part of rod 8 is surrounded by a sleeve 9 through which cooling water is pumped. Of course, the rod can be cooled by other means.

On the upper face of metal plate 7 there is a loose layer 6 of granular material with good electrical conductivity, such as graphite in powder or grain form; if desired with the addition of metal shavings, etc. The purpose of layer 6 is to ensure a good electrical connection between the various parts of the conductive bottom and also to permit the proper bedding of the prefabricated part 4, by eliminating any unevenness.

On layer 6 rests the prefabricated electrically conductive refractory casting comprising part 4, the upper surface of which is in contact with metal bath 10. An electrically conductive metal stiffening element 5 is integral with the lower face of part 4.

In use, the electric circuit is closed between electrode 11 and a clamping device, not shown, on rod 8 or sleeve 9. The electric current flows through the metal charge, the prefabricated part 4, parts 5 and 6 is collected by plate 7 and lead outside the furnace by rod 8.

In order to facilitate erection and maintenance, part 12 of the refractory of the furnace bottom in the immediate vicinity of rod 8 is preferably rammed, while the remainder of the bottom 13 is of conventional refractory brick.

Figure 2:
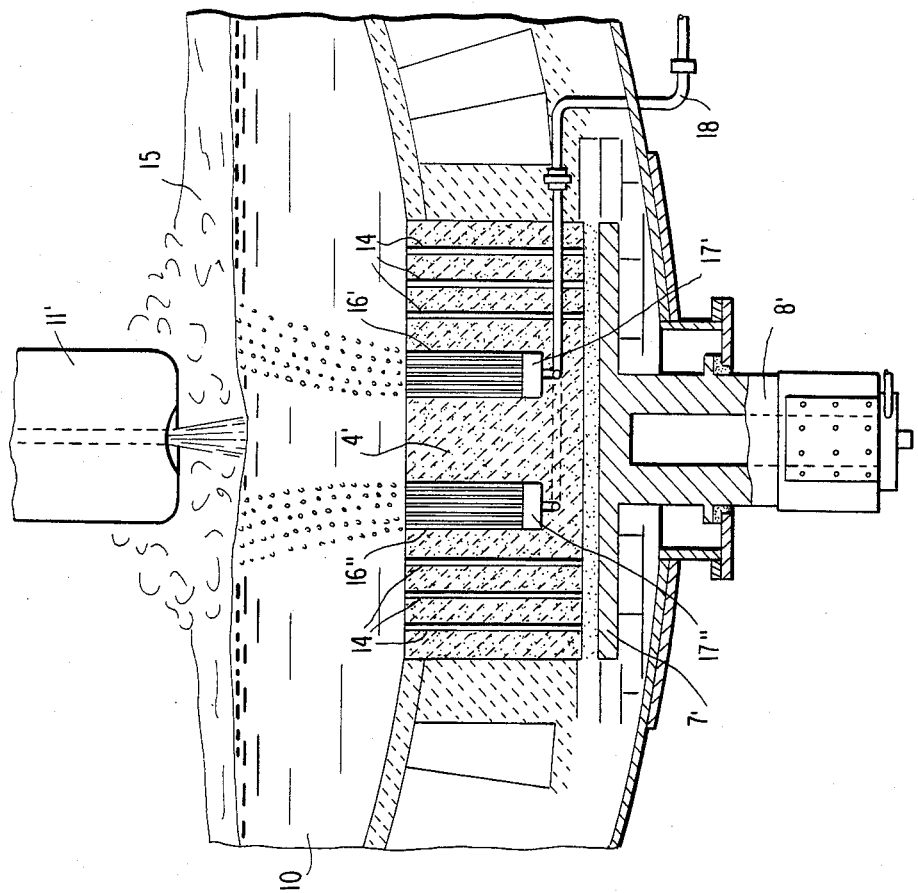
FIG. 2 shows a vertical section through part of the furnace where the porous bricks are installed, with gas blowing.
Figure 3:
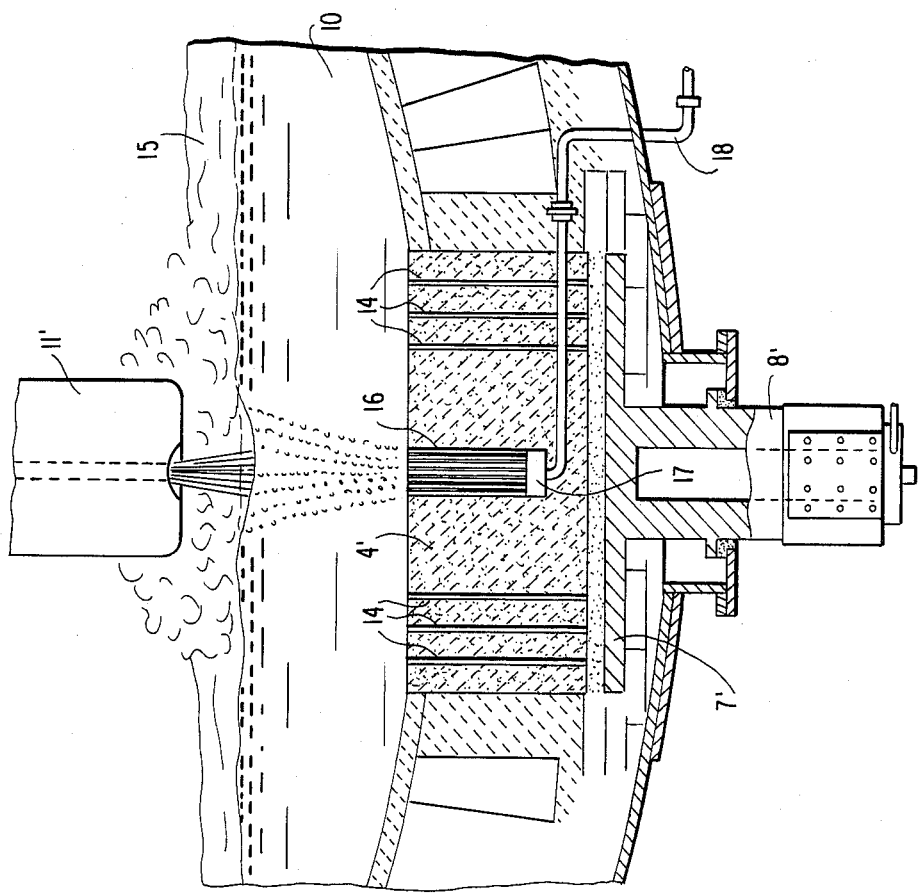
FIG. 3 shows a section similar to that of FIG. 2 but with several porous zones for gas blowing disposed symmetrically around the axis of the furnace.

FIGS. 2 and 3 show only the central part of the furnace and include also part of the metal bath and the layer of slag, as well as the end part of the electrode with its tip dipping into the slag.

In FIG. 2, the reference numeral 4' indicates the prefabricated part through which the current is conducted via metal bars 14, while 10 is again the metal bath and 15 the layer of slag. Numeral 11' is the hollow electrode, 7' the metal plate and 8' the metal rod which collects the current. It is evident how the porous body 16 is buried in the prefabricated part 4', terminating at the upper end on the same level as 4' which forms part of the furnace bottom. The porous body 16 terminates at the lower end in a kind of metal capsule 17 to which is connected the gas supply line 18.

FIG. 3 illustrates two porous bodies 16' and 16" each terminating at the lower end in capsules 17' and 17" which, in this case, form part of a single manifold (not illustrated) to which the gas supply line 18 is connected.

The rising column of gas bubbles leaving the empty channels in porous bodies 16, 16' and 16" is schematized in both cases.

As is readily evident, the rising column of gas also entrains metal which, being in the zone affected by the current transport and especially the arc, is greatly overheated. Hence metal flows are generated; these move from the hotter parts of the furnace to the cooler ones, thus speeding up the scrap melting process.

Furthermore, when the gas encounters the slag, whose composition is carefully controlled by feeding appropriate materials, e.g. through the conduit in the electrode, it causes foaming precisely where the presence of foamed slag is useful and necessary, namely around the tip of the electrode.

This possibility is another important advantage of the present invention, since only by bubbling gas is it possible to obtain foamed slag at any moment in the process and not—as in the known methods—merely during some phase of the process such as, for instance, during oxidizing operation.

The advantages of this invention are evident:
the invention is readily and cheaply adaptable to existing furnaces, the only essential modification being a hole through the furnace bottom;
minimization of heat losses;
very low risk of breakthrough, there being preferably only one outlet, namely along rod 8;
limited electrical resistance.

It should be noted that the cooling envisaged for the free end of the metal rod is completely outside the furnace and is concentrated on the only potential breakthrough route. Trials have shown that under normal conditions this cooling is virtually superfluous and can be extremely limited.

Provision can be made for the installation of heat sensors (not shown) around the metal rod to signal abnormal temperature rises as a result of the penetration of liquid metal. In this case, since the metal rod is an excellent conductor of heat and as it has a relatively small cross section, it suffices to increase the flow of cooling water to solidify the liquid metal that has penetrated and hence permit the melting and pouring operations to be completed before starting on maintenance. During a series of trials run on a small 3.5 ton pilot furnace, equipped with conductive bottom current return as per the present invention, regular operation was possible with a current of up to 12 kA, with an electrical resistance in the bottom of around 0.4 m Ohms. Temperature rise of the furnace bottom caused by the passage of the current was limited, being in the 100°–150° C. range; this occurred after only a few minutes and then remained unchanged.

When the top part of the furnace was relined, it was seen that the bottom was in excellent condition, especially the prefabricated element 4, while maintenance operations were extremely easy.

What is claimed is:

1. A conductive bottom for direct current electric arc furnaces having a hearth with a refractory bottom, the hearth comprising:
   at least one removable electrically-conductive prefabricated element in contact with the metal bath and resting on
   an intermediate part of electrically conductive granular material, resting on
   a terminal metal part, electrically insulated from the shell of the furnace, comprising a conductive metal plate with a metal rod on the face farthest from the bath, which rod passes through said refractory bottom and protrudes partially therefrom.

2. A conductive bottom as claimed in claim 1, in which said removable electrically conductive prefabricated element is a refractory casting with metal bars running vertically through it.

3. A conductive bottom as claimed in claim 1, in which said removable electrically conductive prefabricated element is an electrically conductive refractory casting.

4. A conductive bottom as claimed in claim 1, and an electrically conductive metal element in the form of a plate interposed between said prefabricated element and said intermediate part.

5. A conductive bottom as claimed in claim 1, and at least one body in the furnace bottom for introducing a controllable flow of gas into the metal bath above.

6. A conductive bottom as claimed in claim 5, in which said body comprises at least one porous refractory brick with oriented porosity in the form of vertical channels.

7. A conductive bottom as claimed in claim 6, there being a plurality of said porous bricks grouped in a single area in the center of the electrically-conductive zone of the furnace bottom.

8. A conductive bottom as claimed in claim 6, there being a plurality of said porous bricks arranged around the periphery of the electrically-conductive zone of the furnace bottom in a circular ring.

9. A conductive bottom as claimed in claim 1, and cooling means for cooling the end of said metal rod that is outside the furnace.

* * * * *